(12) United States Patent
Chen et al.

(10) Patent No.: US 11,568,697 B2
(45) Date of Patent: Jan. 31, 2023

(54) SYSTEM FOR COMPOSING IDENTIFICATION CODE OF SUBJECT

(71) Applicant: Southern Taiwan University of Science and Technology, Tainan (TW)

(72) Inventors: Ruei-Tang Chen, Tainan (TW); Fong-Lang Wu, Kouhu Township, Yunlin County (TW)

(73) Assignee: SOUTHERN TAIWAN UNIVERSITY OF SCIENCE AND TECHNOLOGY, Tainan (TW)

( * ) Notice: Subject to any disclaimer, the term of this patent is extended or adjusted under 35 U.S.C. 154(b) by 437 days.

(21) Appl. No.: 16/933,107

(22) Filed: Jul. 20, 2020

(65) Prior Publication Data

US 2021/0279990 A1 Sep. 9, 2021

(30) Foreign Application Priority Data

Mar. 6, 2020 (TW) ................................. 109107483

(51) Int. Cl.
| | | |
|---|---|---|
| G07C 9/37 | (2020.01) | |
| G06V 10/60 | (2022.01) | |
| G06V 40/10 | (2022.01) | |
| G06K 9/00 | (2022.01) | |
| G06T 7/38 | (2017.01) | |

(52) U.S. Cl.
CPC ............ *G07C 9/37* (2020.01); *G06K 9/00523* (2013.01); *G06K 9/00536* (2013.01); *G06T 7/38* (2017.01); *G06V 10/60* (2022.01); *G06V 40/10* (2022.01)

(58) Field of Classification Search
None
See application file for complete search history.

(56) References Cited

U.S. PATENT DOCUMENTS 10,162,431 B2 * 12/2018 Chen ..................... G06F 3/0325

* cited by examiner

*Primary Examiner* — Daniell L Negron
(74) *Attorney, Agent, or Firm* — Muncy, Geissler, Olds & Lowe, P.C.

(57) ABSTRACT

A system includes a lighting module, a processing module, and photovoltaic units. Each of the photovoltaic units receives light reflected off a body portion which is illuminated by light from the lighting module, and converts light energy of the reflected light into electricity. The processing module stores modes each of which specifies a code set. When one of the modes is selected, the processing module activates the lighting module to emit light based on the code set specified by the mode thus selected. The processing module converts electrical quantities measured individually for the photovoltaic units into respective code parameters, and composes an identification code using the code parameters.

10 Claims, 4 Drawing Sheets

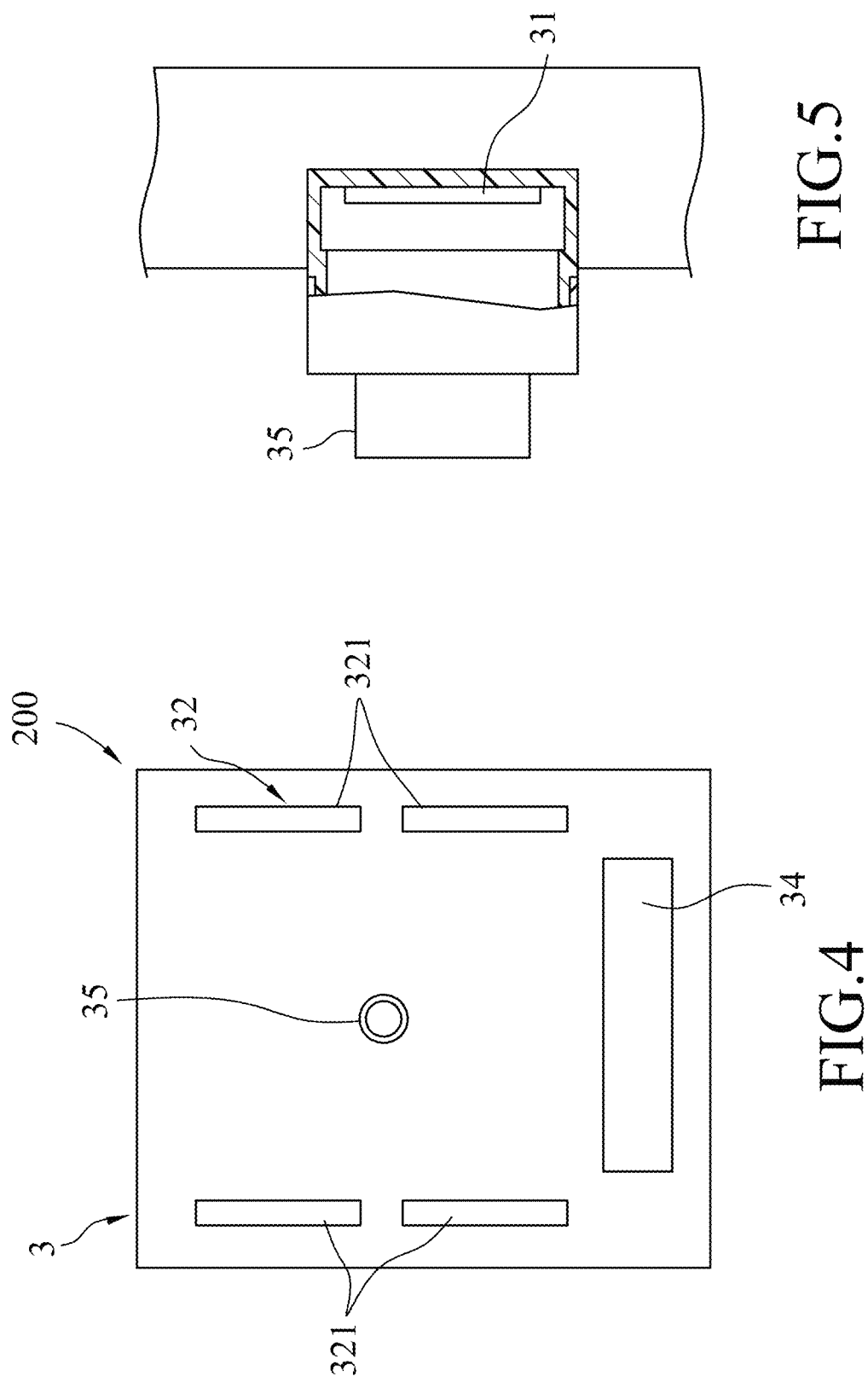

SYSTEM FOR COMPOSING IDENTIFICATION CODE OF SUBJECT

CROSS-REFERENCE TO RELATED APPLICATION

This application claims priority of Taiwanese Invention Patent Application No. 109107483, filed on Mar. 6, 2020.

FIELD

The disclosure relates to a system for composing an identification code for a subject, and more particularly to a system for composing an identification code for a subject by utilizing a photovoltaic module.

BACKGROUND

It is common practice to install a lock on a door in order to prevent strangers from intruding into a private space, an office, etc. However, conventional locks, such as a mechanical lock with a physical key and an electronic lock with an electronic key (e.g., a password, a keycard, etc.), have some disadvantages. For example, the conventional mechanical lock cannot be opened if a corresponding physical key is lost, and the conventional electronic key cannot be opened if a corresponding keycard is lost or the password has been forgotten. There is another type of electronic lock that uses biometric features as a key to open the lock, and the biometric features include fingerprint features, retina features, facial features, etc.

SUMMARY

Therefore, an object of the disclosure is to provide a system for composing an identification code of a subject that can for example be used for access control.

According to the disclosure, the system includes a feature extraction device. The feature extraction device includes a lighting module, a photovoltaic module and a processing module.

The lighting module is configured to be activated to emit light onto a body portion of the subject.

The photovoltaic module includes a plurality of photovoltaic units that are arranged in an array and that are configured to cooperatively receive light reflected off the body portion of the subject which is illuminated by the light from said lighting module. Each of the photovoltaic units is configured to convert light energy of the light received thereby into electricity.

The processing module is communicably connected with the lighting module and the photovoltaic module. The processing module includes a lighting control unit, an electrical measurement unit and an encoding unit.

The lighting control unit stores a plurality of feature extraction modes each of which specifies at least one illumination code set. The at least one illumination code set includes a plurality of illumination codes which are sequentially arranged and each of which corresponds to a specific intensity of illumination. The lighting control unit is configured to, when one of the feature extraction modes is selected, activate the lighting module based on the at least one illumination code set specified by the one of the feature extraction modes thus selected to emit light to sequentially have the specific intensities of illumination that respectively correspond to the illumination codes included in the at least one illumination code set.

The electrical measurement unit is configured to measure, for each of the photovoltaic units of the photovoltaic module, an electrical quantity of the electricity which is generated by the photovoltaic unit.

The encoding unit is electrically connected to the electrical measurement unit, stores a plurality of code parameters which correspond respectively to specific ranges of numerical values, and is configured to convert the electrical quantity measured for each of the photovoltaic units into one of the code parameters which corresponds to one of the specific ranges of numerical values within which the electrical quantity falls, and to compose an identification code using corresponding ones of the code parameters which are obtained through conversion of the electrical quantities of the electricity which is generated by the photovoltaic units, respectively.

BRIEF DESCRIPTION OF THE DRAWINGS

Other features and advantages of the disclosure will become apparent in the following detailed description of the embodiments with reference to the accompanying drawings, of which:

FIG. 4 is a schematic diagram illustrating a front view of a second embodiment of the system according to the disclosure; and FIG. 5 is a schematic diagram illustrating a fragmentary sectional side view of the second embodiment of the system according to the disclosure.

DETAILED DESCRIPTION

Figure 1:
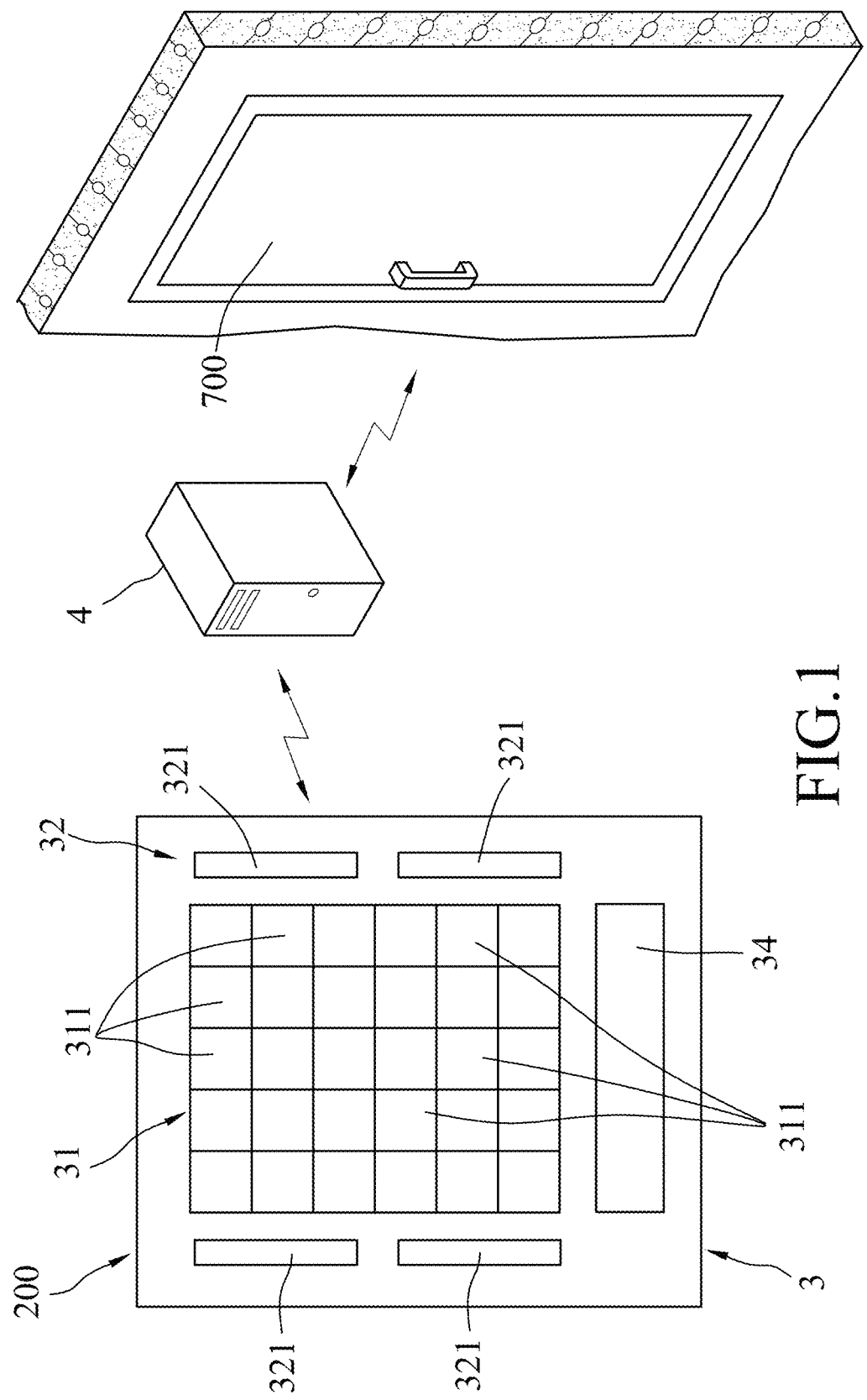
FIG. 1 is a schematic diagram illustrating a first embodiment of a system for composing an identification code of a subject according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
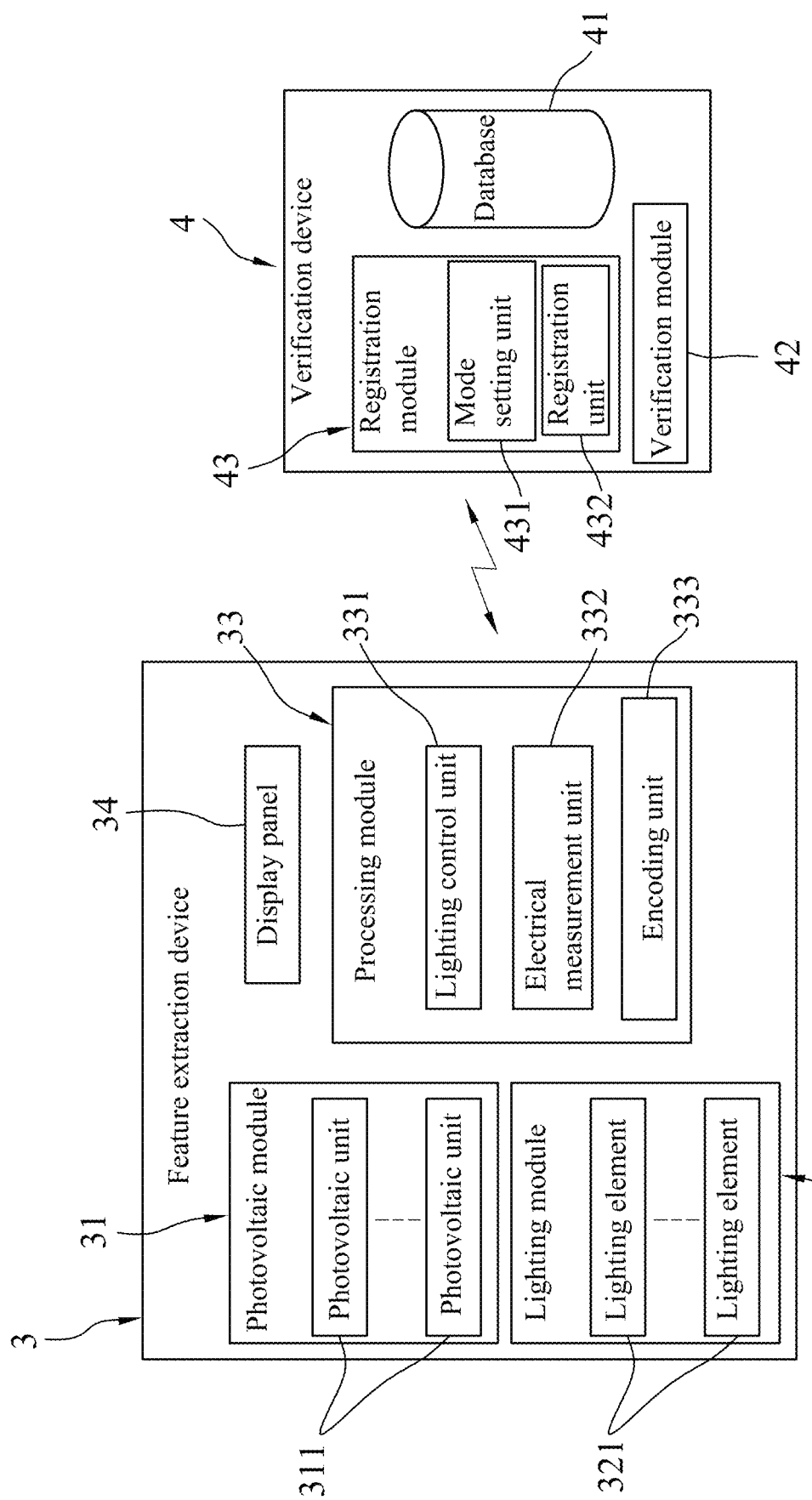
FIG. 2 is a block diagram illustrating the first embodiment of the system according to the disclosure.

Referring to FIGS. 1 and 2, a first embodiment of a system 200 for composing an identification code for a subject according to the disclosure is illustrated. The system 200 may be utilized in an access control scheme for verifying identity of the subject. For example, the system 200 may be an electronic lock preventing an unauthorized user from entering a private space or an office, may be a storage device preventing an unauthorized user from accessing data stored therein, or may be networking hardware preventing an unauthorized user from using network resources provided thereby.

The system 200 includes a feature extraction device 3, and a verification device 4 that is communicable with the feature extraction device 3. The feature extraction device 3 and the verification device 4 may be coupled to each other by using wired or wireless communication, such as Bluetooth, ZigBee, WiFi, the forth generation of wireless mobile telecommunications technology (4G), the fifth generation of wireless mobile telecommunications technology (5G), and so on. In one embodiment, the verification device 4 can be configured as a cloud device, and the feature extraction device 3 is configured to communicate with the verification device 4 over the Internet.

In practice, the feature extraction device 3 may be mounted on a door 700 or a wall beside the door 700. The feature extraction device 3 includes a photovoltaic module 31, a lighting module 32, a processing module 33 and a display panel 34.

The display panel 34 may be implemented by a touchscreen that is configured to be driven to output information (e.g., to display images and/or text) and to be operated by a user to generate a user input. However, implementation of the display panel 34 is not limited to the disclosure herein and may vary in other embodiments.

The lighting module 32 is configured to be activated to emit light onto a body portion of the subject. The body portion of the subject may be a hand, a face, a foot, a trunk or the like of a user. The lighting module 32 includes a plurality of lighting elements 321 placed around the photovoltaic module 31. Each of the lighting elements 321 is individually controllable by the processing module 33 to emit light. In this embodiment, the lighting module 32 includes four lighting elements 321 that are placed symmetrically with respect to the photovoltaic module 31 on two lateral sides of the photovoltaic module 31 as shown in FIG. 1, and the lighting elements 321 on the same lateral side are spaced apart from each other along the vertical direction of the photovoltaic module 31. Each of the lighting elements 321 is implemented by a light-emitting diode (LED). It should be noted that implementations of the arrangement and the type of the lighting elements 321 are not limited to the disclosure herein and may vary in other embodiments.

The photovoltaic module 31 includes a plurality of photovoltaic units 311 that are arranged in an array and that are configured to cooperatively receive light reflected off the body portion of the subject which is illuminated by the light from the lighting module 32. The reflection of the light off the body portion of the subject forms an image 800 on the photovoltaic module 31 (see FIG. 3). Each of the photovoltaic units 311 is configured to convert light energy of the light received thereby into electricity. In this embodiment, the photovoltaic units 311 are implemented by solar cells.

The processing module 33 is communicatively connected with the lighting module 32 and the photovoltaic module 31. The processing module 33 may be implemented by a system on a chip (SoC), or any circuit configurable/programmable in a software manner and/or hardware manner to implement functionalities discussed in this disclosure.

The processing module 33 includes a lighting control unit 331, an electrical measurement unit 332 and an encoding unit 333.

The lighting control unit 331 stores a plurality of feature extraction modes. Each of the feature extraction modes specifies at least one illumination code set, and a predetermined illumination order in which the lighting elements 321 are to be activated to emit light. Each of the at least one illumination code set includes a plurality of illumination codes which are sequentially arranged and each of which corresponds to a specific intensity of illumination. In one embodiment, the lighting control unit 331 is configured to, when one of the feature extraction modes is selected, activate the lighting module 32 based on the at least one illumination code set specified by the one of the feature extraction modes thus selected to emit light to sequentially have the specific intensities of illumination that respectively correspond to the illumination codes included in the at least one illumination code set. In this embodiment, each of the feature extraction modes specifies a plurality of illumination code sets which respectively correspond to the lighting elements 321. When one of the feature extraction modes is selected (referred to as the selected mode hereinafter), the lighting control unit 331 is configured to activate the lighting elements 321 of the lighting module 32 based on the predetermined illumination order that corresponds to the selected mode, and control each of the lighting elements 321 thus activated based on the corresponding one of the illumination code sets specified by the selected mode to emit light to sequentially have the specific intensities of illumination that respectively correspond to the illumination codes included in the corresponding one of the illumination code sets. The lighting control unit 331 may be implemented by a processor, a central processing unit (CPU), a microprocessor, a micro control unit (MCU), or any circuit configurable/programmable in a software manner and/or hardware manner to implement functionalities discussed in this disclosure.

The predetermined illumination order defines a series of stages. In this embodiment, the number of the stages in the series is three, but is not limited to three and may vary in other embodiments. Each of the stages corresponds to a lighting group of the lighting elements 321, which includes m number of the lighting elements 321 where m is a positive integer. When one of the feature extraction modes is selected, the lighting control unit 331 is configured to activate, for each of the stages defined by the predetermined illumination order, each of the m number of the lighting elements 321 in the lighting group that corresponds to the stage, and to control the lighting elements 321 thus activated individually to emit light to sequentially have the specific intensities of illumination that respectively correspond to the illumination codes included in one of the illumination code sets that corresponds to the lighting element 321.

In this embodiment, the lighting control unit 331 is configured to control the display panel 34 to display a user interface (not shown) that illustrates all of the feature extraction modes to allow the user to select one of the feature extraction modes. Each of the feature extraction modes can be illustrated as a text label, icon, image, or the like.

Figure 3:
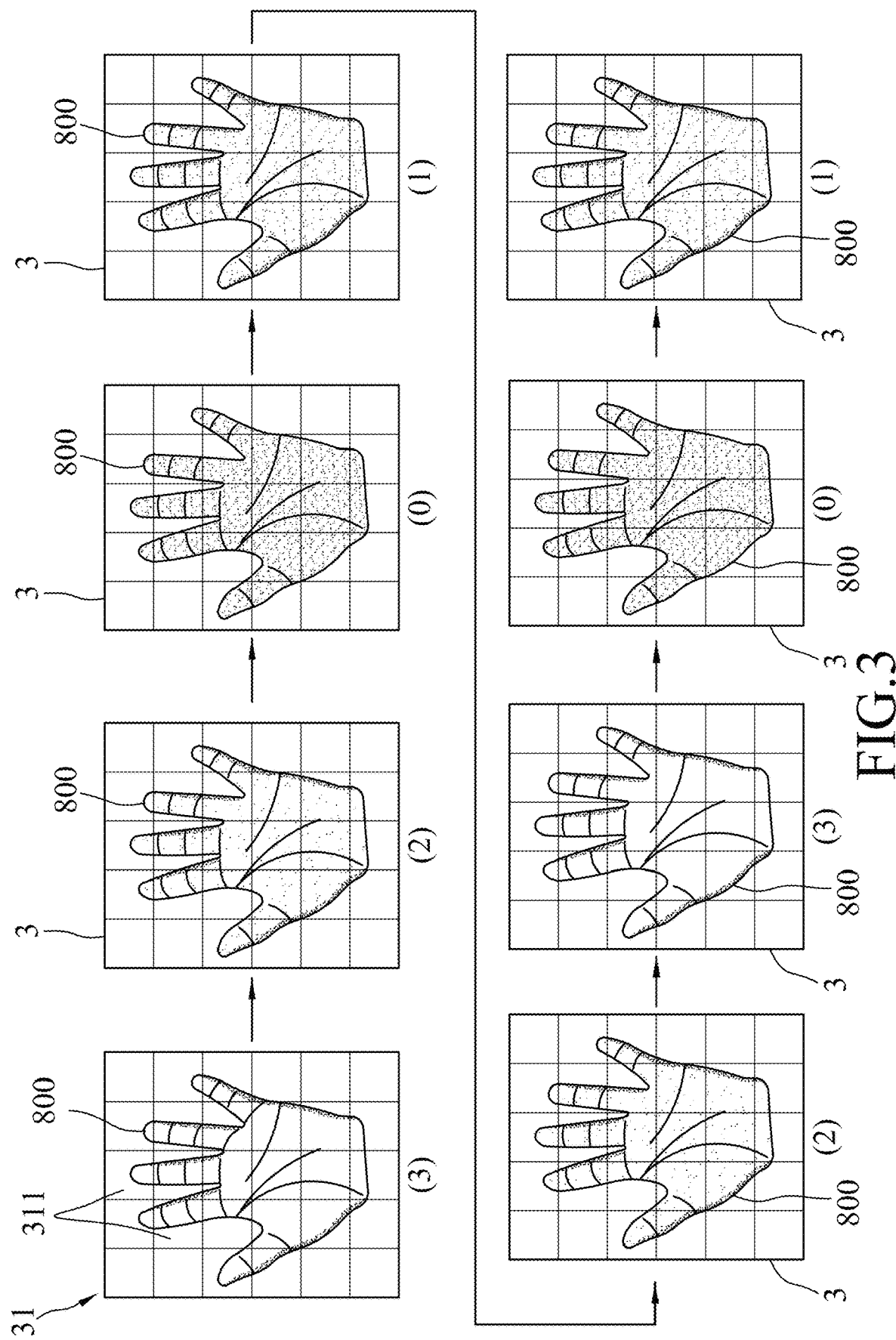
FIG. 3 is a schematic diagram illustrating examples of an image of the palm of the subject that is illuminated by a lighting module based on an illumination code set.

In this embodiment, for each of the lighting elements 321, the illumination code set that corresponds thereto includes eight illumination codes. For example, the illumination code set may be "32012301", wherein the illumination codes "0", "1", "2" and "3" respectively represent four specific intensities of illumination that are different from each other. It should be noted that implementations of the number of the illumination codes in each illumination code set and the form of the illumination codes are not limited to the disclosure herein and may vary in other embodiments. Referring to FIG. 3, in a scenario where the illumination code sets that correspond respectively to the lighting elements 321 are all identical and are each "32012301", the lighting control unit 331 controls the lighting elements 321 to emit light to each have the specific intensities of illumination that respectively correspond to the illumination codes "3", "2", "0", "1", "2", "3", "0" and "1" in sequence. In this way, for each of the specific intensities of illumination, an image 800 of the palm of the user is formed on the photovoltaic units 311 with a respective brightness distribution through reflection of the light emitted by the lighting elements 321 to have the specific intensity. It is noted that a series of exemplary images 800 with different brightness distributions are illustrated by different grayscales in FIG. 3. When the lighting groups that respectively correspond to the stages defined by the predetermined illumination order have different combinations of the lighting elements 321, since the lighting elements 321 are disposed at different positions, the body portion of the subject would be illuminated by light from different angles. In this way, by activating different combinations of the lighting elements 321 to emit light and/or by making the light emitted by the lighting elements 321 have different specific intensities, different reflected light (reflected off the body portion of the subject) would be generated, so images 800 with different brightness distributions would be formed on the photovoltaic units 311.

In one embodiment, for each of the feature extraction modes, the illumination code sets that respectively correspond to the m number of the lighting elements 321 in the lighting group corresponding to an individual one of the stages defined by the predetermined illumination order include an identical arrangement of the illumination codes.

In one embodiment, for each of the feature extraction modes, the illumination code sets that respectively correspond to the m number of the lighting elements 321 in the lighting group corresponding to an individual one of the stages defined by the predetermined illumination order include different arrangements of the illumination codes.

The electrical measurement unit 332 is configured to measure, for each of the photovoltaic units 311 of the photovoltaic module 31, an electrical quantity of the electricity which is generated by the photovoltaic unit 311. The electrical measurement unit 332 may be implemented by a field-effect transistor volt meter (FET-VM) or any circuit configurable/programmable in a software manner and/or hardware manner to implement functionalities discussed in this disclosure.

The encoding unit 333 is electrically connected to the electrical measurement unit 332. The encoding unit 333 stores a plurality of code parameters which correspond respectively to specific ranges of numerical values. The encoding unit 333 is configured to convert the electrical quantity measured for any one of the photovoltaic units 311 into one of the code parameters which corresponds to one of the specific ranges of numerical values within which the electrical quantity falls, and to compose the identification code using corresponding ones of the code parameters which are obtained through conversion of the respective electrical quantities measured for all the photovoltaic units 311. The encoding unit 333 may be implemented by an encoder, a processor, a CPU, a microprocessor, an MCU, or any circuit configurable/programmable in a software manner and/or hardware manner to implement functionalities discussed in this disclosure.

Subsequently, the encoding unit 333 is configured to transmit to the verification device 4 identification information that contains the identification code thus composed and the selected mode that corresponds to the identification code (i.e., the selected mode in which the identification code is composed). Since implementation of composing the identification code by using the code parameters has been well known to one skilled in the relevant art, detailed explanation of the same is omitted herein for the sake of brevity.

In one embodiment, the electrical measurement unit 332 is configured to measure, for each of the photovoltaic units 311 of the photovoltaic module 31, the electrical quantity of the electricity generated by the photovoltaic unit 311 each time the lighting control unit 331 controls one of the lighting elements 321 to emit light to have the specific intensity of illumination to which one of the illumination codes corresponds. In a scenario where the illumination code set includes eight illumination codes, the encoding unit 333 generates eight code parameters for each of the photovoltaic units 311.

In one embodiment, the electrical measurement unit 332 is configured to measure, for each of the photovoltaic units 311 of the photovoltaic module 31, the electrical quantity of the electricity generated by the photovoltaic unit 311 every n-th time a specific one of the lighting elements 321 is activated to emit light to have the specific intensity of illumination to which one of the illumination codes corresponds, where n is a positive integer not smaller than two. In a scenario where the illumination code set includes eight illumination codes and n is equal to two, for each of the photovoltaic units 311, the encoding unit 333 generates four code parameters because the electrical measurement unit 332 measures the electrical quantities generated by the photovoltaic units 311 for four times in total.

The verification device 4 includes a database 41, a verification module 42 and a registration module 43. The verification device 4 may be implemented by a computer, a microcontroller, an SOC, or any circuit configurable/programmable in a software manner and/or hardware manner to implement functionalities discussed in this disclosure.

The database 41 stores a plurality of registered codes, and a plurality of feature extraction modes that are respectively associated with the registered codes stored in the database 41.

The verification module 42 is configured to receive the identification information from the encoding unit 333. In one embodiment, the verification module 42 is configured to determine whether the identification code composed by the encoding unit 333 and contained in the identification information matches one of the registered codes, and to output a verification signal indicating that the subject has been verified when it is determined that the identification code matches one of the registered codes. In one embodiment, the verification module 42 is configured to output the verification signal indicating that the subject has been verified when it is determined that a combination of the one of the feature extraction mode that is selected for activating the lighting module 32 (i.e., the selected mode) and the identification code that is composed under the selected mode matches a combination of one of the feature extraction modes and the associated one of the registered codes that is stored in the database 41. In response to receipt of the verification signal indicating that the subject has been verified, the system 200 allows the subject (i.e., the user), for example, to enter the private space or the office, to access the data stored in the system 200, or to use the network resource provided by the system 200, depending on the implementation of the system 200. The verification module 42 may be implemented by a processor, a CPU, a microprocessor, an MCU, or any circuit configurable/programmable in a software manner and/or hardware manner to implement functionalities discussed in this disclosure.

The registration module 43 is configured to be operated to register a new code for a new user. Specifically speaking, the registration module 43 includes a mode setting unit 431 and a registration unit 432. The mode setting unit 431 is configured to control the display panel 34 to display a setting interface (not shown) for allowing the user to add a new feature extraction mode by setting the predetermined illumination order and the illumination code set(s) for the new feature extraction mode. After the new feature extraction mode is established, the registration unit 432 is configured to send the new feature extraction mode to the lighting control unit 331 for storage therein as an additional feature extraction mode (in other words, the number of the feature extraction modes stored in the lighting control unit 331 is increased by one), and to control the lighting control unit 331 to drive the lighting module 32 according to the new feature extraction mode. At the same time, the light emitted by the lighting module 32 is reflected off a body portion that is positioned in front of the photovoltaic module 31 so the reflected light forms an image 800 on the photovoltaic module 31. The registration unit 432 is further configured to control the encoding unit 333 to compose the new code in the above-mentioned manner of composing an identification code, to receive the new code from the encoding unit 333, to associate the new code with the new feature extraction mode, and to store the new code to the database 41 as an additional registered code (in other words, the number of registered codes stored in the database 41 is increased by one). In some embodiments, the new code can be further associated with additional properties including, but not limited to, permission to access in the case where the system 200 is to control access into a private space or an office, a access duration in the case where the system 200 is to control access of data stored therein, or limitation of network traffic in the case where the system 200 is to control use of network resources, depending on the implementation of the system 200. Each of the mode setting unit 431 and the registration unit 432 may be implemented by a processor, a CPU, a microprocessor, a MCU, or any circuit configurable/programmable in a software manner and/or hardware manner to implement functionalities discussed in this disclosure.

In use of the system 200 according to the disclosure, the lighting control unit 331 controls the display panel 34 to display the user interface illustrating all of the feature extraction modes to allow the user to select one of the feature extraction modes. Thereafter, the user needs to operate the user interface on the display panel 34 to select one of the feature extraction modes shown in the user interface. Once the user has selected one of the feature extraction modes and places his/her body portion (e.g., the palm) in front of the photovoltaic module 31, the lighting control unit 331 controls the lighting module 32 to emit light according to the predetermined illumination order and the illumination code set(s) specified by the selected mode. The electrical measurement unit 332 measures the electrical quantities of the electricity that is generated by the photovoltaic units 311 each time the lighting control unit 331 controls one of the lighting elements 321 of the lighting module 32 to emit light. Then, the encoding unit 333 converts the electrical quantities into corresponding ones of the code parameters, and composes the identification code using the corresponding ones of the code parameters. It is worth to note that in some embodiments, the body portion of the user in front of the photovoltaic module 31 may be stabilized by using an assistive positioning device. When the identification information that contains the identification code and the selected mode is sent to the verification module 42, the verification module 42 determines whether a combination of the feature extraction mode and the identification code contained in the identification information matches (i.e., is identical to) a combination of one of the feature extraction modes and the associated one of the registered codes stored in the database 41, and the verification module 42 outputs the verification signal to, for example, a lock controller to indicate that the user has been verified when a match is found.

Referring to FIGS. 2, 4 and 5, a second embodiment of the system 200 for verifying identity of a subject according to the disclosure is illustrated. Since the second embodiment is similar to the first embodiment, only differences therebetween will be discussed below for the sake of brevity.

For the second embodiment, the feature extraction device 3 further includes a lens module 35 disposed in front of the photovoltaic module 31. The lens module 35 is configured to direct the light reflected off an object placed in front of the lens module 35 to the photovoltaic module 31 so as to form a projection image thereon. The lens module 35 may be implemented by one or more optical lenses. Since techniques of optical lens have been well known to one skilled in the relevant art, detailed explanation of the same is omitted herein for the sake of brevity.

In this embedment, the photovoltaic module 31 is implemented by a charge-coupled device (CCD) image sensor or a complementary metal-oxide-semiconductor (CMOS) image sensor, and the photovoltaic units 311 are implemented by MOS capacitors for the CCD image sensor, or by pixel sensor unit cells, each of which includes a photodetector and a transistor, for the CMOS image sensor. Similar to the first embodiment, the electrical quantity of the electricity generated by each of the MOS capacitors or the pixel sensor unit cells can be measured by the electrical measurement unit 332 for subsequent composition of the identification code.

In sum, the system 200 according to this disclosure emits light onto a body portion, and the light reflected off the body portion forms an image with a specific brightness distribution through reflection. Since the body portion (e.g., the palm of a user) has a unique three-dimensional appearance, the specific brightness distribution of the image of the body portion will also be unique. Accordingly, a group of the electrical quantities generated respectively by the photovoltaic units 311 is unique, and thus, the identification code composed of code parameters converted from the electrical quantities is also unique and can be used to verify the identity of the user. Moreover, variations of the illumination code sets and the predetermined illumination orders specified by the feature extraction modes help expand possible variations of the specific brightness distribution of the image of the subject, and thus contribute to enhance the complexity of the identification code. Therefore, it would be difficult to counterfeit the identification code, thereby enhancing security provided by the system 200. Further, the photovoltaic module 31 can also convert solar energy into electricity that can be used by the system 200.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for composing an identification code of a subject, comprising a feature extraction device, wherein said feature extraction device includes:
   a lighting module configured to be activated to emit light onto a body portion of the subject;
   a photovoltaic module including a plurality of photovoltaic units that are arranged in an array and that are configured to cooperatively receive light reflected off the body portion of the subject which is illuminated by the light from said lighting module, each of said photovoltaic units being configured to convert light energy of the light received thereby into electricity; and
   a processing module communicably connected with said lighting module and said photovoltaic module, and including
      a lighting control unit that stores a plurality of feature extraction modes each of which specifies at least one illumination code set, each of the at least one illumination code set including a plurality of illumination codes which are sequentially arranged and each of which corresponds to a specific intensity of illumination, said lighting control unit being configured to, when one of the feature extraction modes is selected, activate said lighting module based on the at least one illumination code set specified by the one of the feature extraction modes thus selected to emit light to sequentially have the specific intensities of illumination that respectively correspond to the illumination codes included in the at least one illumination code set,
      an electrical measurement unit that is configured to measure, for each of said photovoltaic units of said photovoltaic module, an electrical quantity of the electricity which is generated by said photovoltaic unit, and
      an encoding unit that is electrically connected to said electrical measurement unit, that stores a plurality of code parameters which correspond respectively to specific ranges of numerical values, and that is configured to convert the electrical quantity measured for each of said photovoltaic units into one of the code parameters which corresponds to one of the specific ranges of numerical values within which the electrical quantity falls, and to compose an identification code using corresponding ones of the code parameters which are obtained through conversion of the electrical quantities of the electricity which is generated by said photovoltaic units, respectively.

2. The system as claimed in claim 1, wherein:
   said lighting module includes a plurality of lighting elements placed around said photovoltaic module;
   each of said lighting elements is individually controllable by said lighting control unit to emit light;
   each of the feature extraction modes further specifies a predetermined illumination order in which said lighting elements are to be activated to emit light, and a plurality of illumination code sets which respectively correspond to said lighting elements; and
   said lighting control unit is configured to, when one of the feature extraction modes is selected, activate said lighting elements to emit light based on the predetermined illumination order, and controls, for each of said lighting elements thus activated, said lighting element to emit light to sequentially have the specific intensities of illumination that respectively correspond to the illumination codes included in one of the illumination code sets that corresponds to said lighting element.

3. The system as claimed in claim 2, wherein:
   the predetermined illumination order defines a series of stages;
   each of the stages corresponds to a lighting group of said lighting elements, which includes m number of said lighting elements where m is a positive integer; and
   said lighting control unit is configured to, when one of the feature extraction modes is selected, activate, for each of the stages defined by the predetermined illumination order, each of the m number of said lighting elements in the lighting group that corresponds to the stage to emit light to sequentially have the specific intensities of illumination that respectively correspond to the illumination codes included in one of the illumination code sets that corresponds to said lighting element.

4. The system as claimed in claim 3, wherein for each of the feature extraction modes, the illumination code sets that respectively correspond to the m number of said lighting elements in the lighting group which corresponds to an individual one of the stages defined by the predetermined illumination order include an identical arrangement of the illumination codes.

5. The system as claimed in claim 3, wherein for each of the feature extraction modes, the illumination code sets that respectively correspond to the m number of said lighting elements in the lighting group which corresponds to an individual one of the stages defined by the predetermined illumination order include different arrangements of the illumination codes.

6. The system as claimed in claim 2, wherein said electrical measurement unit is configured to measure, for each of said photovoltaic units, the electrical quantity of the electricity generated by said photovoltaic unit each time said lighting control unit controls one of said lighting elements to emit light to have the specific intensity of illumination to which one of the illumination codes corresponds.

7. The system as claimed in claim 2, wherein said electrical measurement unit is configured to measure, for each of said photovoltaic units, the electrical quantity of the electricity generated by said photovoltaic unit every n-th time a specific one of said lighting elements is activated to emit light to have the specific intensity of illumination to which one of the illumination codes corresponds, where n is a positive integer not smaller than two.

8. The system as claimed in claim 2, further comprising:
   a verification device communicable with said feature extraction device, and including
      a database that stores a plurality of registered codes, and
      a verification module that is configured to determine whether the identification code composed by said encoding unit matches one of the registered codes, and to output a verification signal indicating that the subject has been verified when it is determined that the identification code matches one of the registered codes.

9. The system as claimed in claim 8, wherein:
   said database further stores a plurality of feature extraction modes that are respectively associated with the registered codes stored in said database; and
   said verification module is configured to output the verification signal indicating that the subject has been verified when it is determined that a combination of the one of the feature extraction mode which is selected for activating said lighting module and the identification code which is composed under the one of the feature extraction mode matches a combination of one of the feature extraction modes and the associated one of the registered codes stored in said database.

10. The system as claimed in claim 9, wherein:
said feature extraction device further includes a display panel; and
said verification device further includes a registration module that includes
- a mode setting unit which is configured to control said display panel to display a setting interface for allowing a user to add a new feature extraction mode by setting the predetermined illumination order and the illumination code sets for the new feature extraction mode, and
- a registration unit which is configured to send the new feature extraction mode to said lighting control unit for storage therein as an additional feature extraction mode, to control said lighting control unit to drive said lighting module according to the new feature extraction mode, to control said encoding unit to compose a new code, to receive the new code from said encoding unit, to associate the new code with the new feature extraction mode, and to store the new code in said database as an additional registered code.

* * * * *